Aug. 12, 1924.

E. H. ANGIER ET AL 1,504,733

PACKAGE

Filed March 14, 1922

Inventors
Edward H. Angier,
William M. Wheildon
Emery, Booth, Janney & Varney Attys.

Patented Aug. 12, 1924.

1,504,733

UNITED STATES PATENT OFFICE.

EDWARD H. ANGIER AND WILLIAM M. WHEILDON, OF FRAMINGHAM, MASSACHU-
SETTS; SAID WHEILDON ASSIGNOR TO SAID ANGIER.

PACKAGE.

Application filed March 14, 1922. Serial No. 543,689.

*To all whom it may concern:*

Be it known that we, EDWARD H. ANGIER and WILLIAM M. WHEILDON, citizens of the United States, and residents of Framingham, county of Middlesex, and State of Massachusetts, have invented an Improvement in Packages, of which the following description, in connection with the accompanying drawings, is a specification, like characters on the drawings representing like parts.

This invention relates to packages and designs to provide a method for fitting an article with a covering of wrapping material closely conforming thereto. It is applicable to those articles having a longer outer dimension and a shorter inner dimension, which may be referred to as toric, that word denoting a solid which may be considered as produced by the revolution of a figure about an axis exterior thereto. Examples of such articles are coils of wire and the shoes of vehicle tires, in which case the revolution is a complete one and the article is annular.

Our invention may be understood from the following description of an embodiment thereof taken in connection with the accompanying drawings, wherein.

Figure 1:
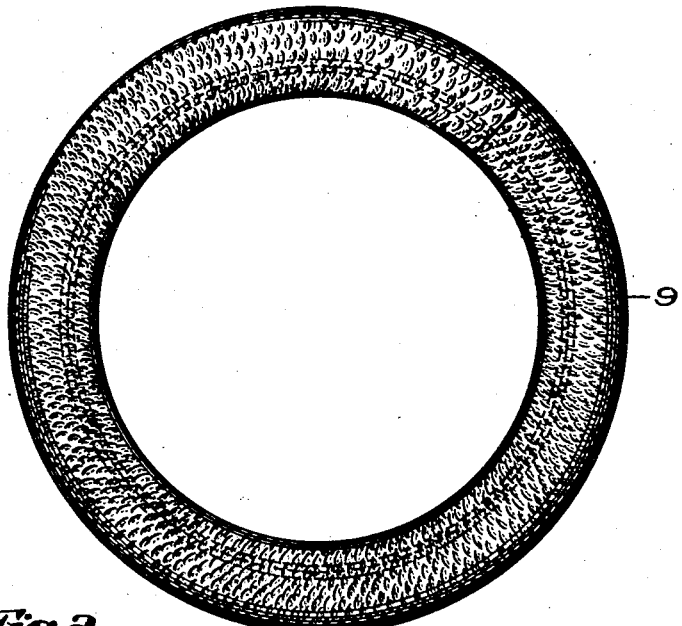
Fig. 1 is a side elevation of a pneumatic vehicle tire enclosed in a wrapping illustrative of my invention.

As we anticipate a major field of usefulness for our invention in packaging the shoes of pneumatic vehicle tires and have illustrated such a shoe or tire in the drawing, we shall for convenience in the following description refer specifically to a tire as the article enclosed.

Figure 4:
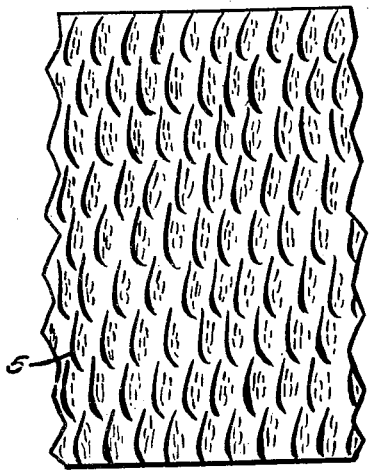
Fig. 4 is a plan view of a portion of the wrapping material preferably used.

In wrapping a tire or other ring shaped body difficulties are encountered in making a smooth fitting wrapping because distances measured along various parts of the tire are markedly different as contrasted with an article of block-like form, the surface of which consists of a number of planes which can be fitted with a sheet of wrapping material such as paper by a simple folding or bending of the same. In accordance with our present invention, therefore, we utilize wrapping material capable of expansion in localized areas or zones thereof to permit it to be shaped to the tire. Referring to Fig. 4, we have there shown a material suitable for the purpose consisting of one or more thicknesses of heavy paper suitably prepared to provide for local extensibility. This is most conveniently effected through a craping process providing irregular resilient embossments 5 throughout the area of the paper. The various gatherings or crapes may be stretched out, moreover, against their natural resiliency without substantially affecting the crapings or gatherings of adjacent areas and the wrapping material thus changed from its normally flat shape.

In accordance with our invention we utilize a band or strip of material such as described preferably provided with transverse crapings which extend throughout the entire area thereof as indicated in Fig. 4, the entire strip being expansible and no part thereof being restrained either because it is itself unprovided with stretchable embossments or because it is restrained by any added element. This is essential to permit articles of varying form and size to be successfully wrapped.

Figure 2:
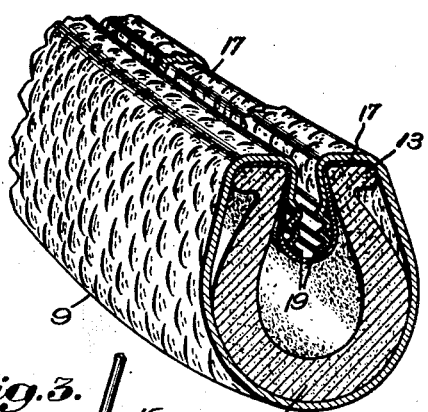
Fig. 2 is a diagrammatic fragmentary perspective view of a portion of a wrapped tire.

Referring to Figs. 1 and 2, we may provide a strip 9 of craped or similarly prepared material which has a considerable range of extensibility and is of suitable width and applied lengthwise along one of the circumferences of the tire, such as the outer circumference or tread. Then by stretching the central portion of the band 9 it is expanded relatively to the side edges and assumes a cup-like or channel form which permits it to be fitted over and conform to the double curvature of the tire and closely fit the same although the circumference measured along the tread is markedly greater than the circumference at points inwardly thereof. Longitudinal zones of the strip expand in accordance with the demands upon them to permit the wrapping to fit the tire. In Fig. 2 we have attempted to indicate the differential expansion but it will be understood that the disclosure is diagrammatic and in particular that the form and size of the embossments 5 are exaggerated and shown in a conventional manner. Preferably the strip 9 is made of such length as completely to encircle the tire.

To complete the package and hold the wrapping strip 9 in position the edges of the strip as at 11 are preferably tucked inwardly into the interior of the enclosed article, that is, in the case of a tire they are wrapped around the beads 13. As the strip is folded along a curve or arc there is little tendency for it to unfold and this tucking in of the edges even in cases where the adjacent parts of the article do not bear on and lock the tucked in edges is effective for holding the wrapping in position.

If desired, the inturned edge portions 11 may be stiffened after they have been folded in to prevent their coming out from the interior of the article. Thus, for example, they may be coated with silicate of soda or other stiffening material, as indicated diagrammatically in Fig. 3 by the showing of a brush 15.

Figure 3:
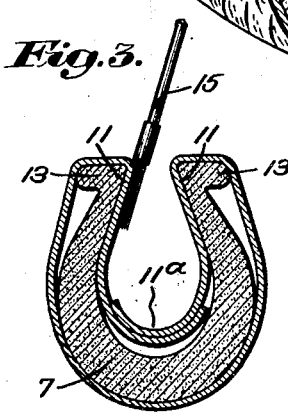
Fig. 3 is a transverse section of a tire and illustrates a modification.

In Fig. 3 we have also shown the strip 9 of such width that the inturned edge portions 11 overlap each other at 11ª in the interior of the tire and form a cover protecting the inner surface thereof.

In Fig. 2 we have shown an arrangement more particularly applicable for tires for protecting the interior of the tire by bridging over the opening between the two edges of the wrapper 9. For this purpose we may utilize a strip 17 extending circumferentially around the interior circumference of the tire and having a central pleat 19 projecting in between the beads and, among other things, serving to position the strip. The sides of the pleat 19 lie adjacent the inturned edges 11 of the wrapping and form a long joint through which foreign matter cannot easily work. Preferably the strip 17 is also made of craped paper and the rough surfaces thereof cooperating with the rough surfaces of the wrapping strip frictionally interlock the wrapper and the strip along this long joint. It is very difficult for two pieces of such craped material to slide one on another especially when bent along a curve as here. If the strip 17 is first applied to the beads of the tire as shown, the wrapping 9 folded over the beads will position it and the edges of the wrapping tucked into the pleat 17 will be held there frictionally with considerable force in a joint which is efficient to resist entry of foreign matter to the tire.

If it is desired to provide a sealed package the strip 17 and the edges of the wrapper 9 may be adhesively secured together at the bases of the bead. The strip 17 may be sealed to the wrapper 9 either on the inside or at the outside. The central pleat 19 forms an expansion joint and if the tire is subjected to a shock so that it flattens and the beads 13 spread apart, the pleat 19 will flatten out and take up the shock of the beads without danger of the strip 17 splitting or breaking away.

Preferably the sealing strip 17 is made of craped paper similar to the strip 9. Because of the central pleat various portions of the strip lie in circumferences of different diameter when the strip is wrapped around the interior circumference of the tire. The provision of the expansible resilient embossments 5 permits the strip 17 to expand locally as it is applied to adapt itself to the situation. The embossments of the strip 17 will also tend to interlock with those of the inturned edges 11 and this interengagement of the two rough surfaces aids in maintaining the parts in position.

Having thus described the form of our invention shown by way of example in the accompanying drawings, what we claim as new and desire to secure by Letters Patent we shall express in the following claims.

Claims:

1. The method of packaging toric articles which comprises applying along one of the circumferences thereof a strip of wrapping material capable of substantially unrestrained local expansion, differentially expanding the strip to fit it to and around the article and tucking the edges of the strip into the interior of the article along the other circumference.

2. The method of packaging tire shoes and the like which comprises applying along the tread thereof a strip of wrapping material capable of substantially unrestrained local expansion, differentially expanding the strip to fit it to and around the tire and folding the edges inwardly around the beads.

3. The method of packaging tire shoes and the like which comprises applying along the tread thereof a strip of wrapping material capable of substantially unrestrained local expansion, differentially expanding the strip to fit it to and around the tire, folding the edges inwardly around the beads and applying stiffening to the edges.

4. The method of packaging tire shoes and the like which comprises applying along the tread thereof a strip of wrapping material capable of substantially unrestrained local expansion, differentially expanding the strip to fit it to and around the tire and joining the edges by a transversely expansible sealing strip extending around the inner circumference.

5. A package comprising a toric article and a wrapping applied circumferentially along one of the circumferences thereof and overlying the sides of the tire, said wrapping comprising throughout its area differentially expanded gatherings and thereby conforming to the enclosed article, the edges of the wrapping being tucked into the interior of the article.

6. A package comprising a toric article and a covering therefor comprising a strip of crinkled paper applied circumferentially and differentially expanded to fit the cross-sectional contour of the article, said strip having its edges tucked into the interior of the article.

7. A package comprising a tire shoe or the like and a circumferentially applied wrapping enclosing the tread and sides of the same comprising throughout its area differentially expanded gatherings and thereby conforming to the enclosed article, the edges of said wrapping being folded in about the beads.

8. A package comprising a tire shoe or the like and a circumferentially applied wrapping enclosing the tread and sides of the same comprising throughout its area differentially expanded gatherings and thereby conforming to the enclosed article, the edges of said wrapping being folded in about the beads, the infolded portions substantially covering the interior surface of the tire.

9. A package comprising a tire shoe or the like and a circumferentially applied wrapping enclosing the tread and sides of the same comprising throughout its area differentially expanded gatherings and thereby conforming to the enclosed article, the edges of said wrapping being folded in about the beads, the infolded portions being suitably stiffened.

10. A package comprising a tire shoe or the like, a circumferentially applied wrapping enclosing the tread and sides of the tire comprising throughout its area differentially expanded gatherings and thereby conforming to the enclosed article and a strip extending around the inner circumference of the article and joining the edges of the wrapping, said strip having a longitudinal pleat providing for transverse expansion thereof.

11. A package as defined in claim 10 wherein the pleated strip comprises differentially expanded gatherings permitting it to conform to the circular form of the tire.

12. A tire having a craped strip circumferentially applied thereto, stretched around the same and having its edges tucked in between the beads.

13. A package comprising a tire shoe, a circumferentially applied wrapping enclosing the tread and sides of the tire comprising throughout its area differentially expanded gatherings and thereby conforming to the enclosed tire and having edge portions folded inwardly around the beads of the tire, a strip extending around the inner circumference of the tire and having a central pleat projecting in between the beads of the tire, the edges of the wrapping being folded over said strip and tucked into the pleat.

14. A package comprising a toric article and a wrapping consisting of a strip of paper extending circumferentially along one of the circumferences thereof and folded inwardly over the sides of the article, the strip being suitably gathered to fit it to the article and the edges of the strip being tucked into the interior of the article along the other circumference thereof.

15. A package comprising a tire shoe or the like and a wrapping consisting of a strip of paper extending circumferentially along the tread thereof and folded inwardly over the sides of the tire, the strip being suitably gathered to fit it to the tire and the edges of the strip being infolded around the beads of the tire.

16. The method of packaging a toric article which comprises fitting a circumferentially extending strip of paper along one circumference and over the sides of the tire by suitable gathering of the paper and securing the edges of the strip along the other circumference by tucking them into the interior of the article.

In testimony whereof, we have signed our names to this specification.

EDWARD H. ANGIER.
WILLIAM M. WHEILDON.